E. BLAU.
MEANS FOR AUTOMATICALLY SUPPLYING STORAGE BATTERIES WITH DISTILLED WATER.
APPLICATION FILED MAR. 20, 1919.
1,361,437.
Patented Dec. 7, 1920.
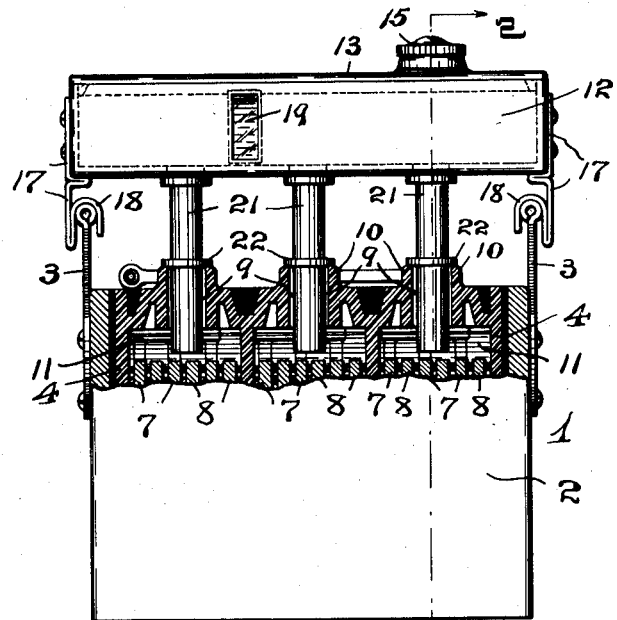
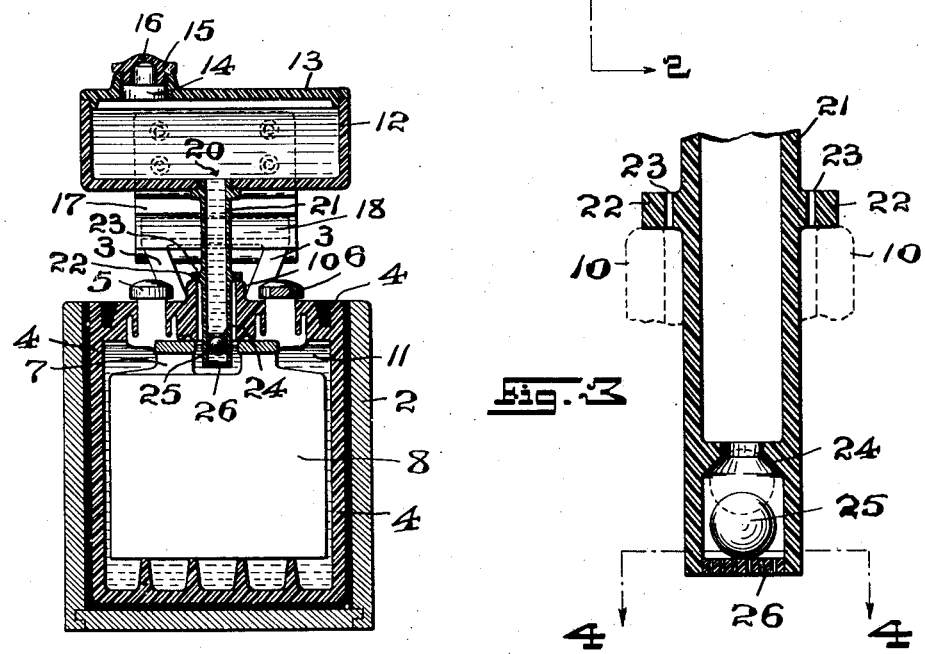
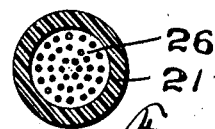
INVENTOR:
Edward Blau,
BY
Fraentzel and Richards,
ATTORNEYS

UNITED STATES PATENT OFFICE.

EDWARD BLAU, OF NEWARK, NEW JERSEY.

MEANS FOR AUTOMATICALLY SUPPLYING STORAGE BATTERIES WITH DISTILLED WATER.

1,361,437.  Specification of Letters Patent.  Patented Dec. 7, 1920.

Application filed March 20, 1919. Serial No. 283,848.

*To all whom it may concern:*

Be it known that I, EDWARD BLAU, a citizen of the United States, residing at Newark, in the county of Essex and State of New Jersey, have invented certain new and useful Improvements in Means for Automatically Supplying Storage Batteries with Distilled Water; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in storage-batteries used more particularly with lighting systems and with self-starters for automobiles; and, the present invention has reference, more particularly, to provide in connection with a storage-battery, means in the form of a reservoir adapted to receive a quantity of distilled water, coöperating with the cell or cells of the battery to maintain a constant supply of the distilled water to each cell, so that the proper level of the electrolyte within the cell above the plates therein is automatically maintained.

The present invention, therefore, has for its principal object to provide a novel and simply constructed means for automatically providing each cell with a constant supply of distilled water, so as to keep the plates entirely submerged in the electrolyte, and by thus maintaining the same level above the plates preventing the breaking down or deterioration of the battery.

The present invention has for its further object to provide an automatically operating filling means for supplying distilled water to the battery which is easily and quickly applied to the battery without requiring any changes in the battery construction, and which means can be just as readily removed and replaced by the novice, when it is desired to make the usual hydrometer tests of the solution within the cells of the battery.

Other objects of the present invention not at this time more particularly enumerated will be clearly understood from the following detailed description of the present invention.

With the various objects of the present invention in view, the said invention consists, primarily, in the novel and automatically operating filling means for supplying the cell or cells of storage-batteries with distilled water, hereinafter more fully set forth; and, the invention consists, furthermore, in the novel arrangements and combinations of the various devices and parts, as well as in the details of the construction of the said parts, all of which will be more fully described in the following specification, and then finally embodied in the clauses of the claim which are appended to and which form an essential part of the said specification.

The invention is clearly illustrated in the accompanying drawings, in which:—

Figure 1 is a view of a storage-battery, shown partly in elevation and partly in longitudinal vertical section, with an automatically operating filling means connected with the battery, said filling means being shown in elevation, and said view showing one embodiment of the principles of the present invention, and one manner of operatively connecting said filling means with the cells of the battery.

Fig. 2 is a transverse vertical section of the devices shown in said Fig. 1, said section being taken on line 2—2 in said Fig 1; Fig. 3 is a vertical section, on an enlarged scale, of a portion of one of the delivery ducts leading from said filling means; and Fig. 4 is a horizontal section of the same, said section being taken on line 4—4 in said Fig. 3.

Similar characters of reference are employed in the said above described views, to indicate corresponding parts.

Referring now to the several figures of the drawings, the reference-character 1 indicates any suitable form of storage-battery, the same being disposed within the usual compartment 2 provided upon its ends with upwardly extending handles 3 of any usual construction. The reference-character 4 indicates the usual jar or cell provided in its closed top with the usual terminals 5 and 6 respectively connected with positive and negative plates 7 and 8. The closed top of each cell is provided with a filling-opening 9 formed with the internally screw-threaded portion 10, each opening 9 in the usual form of battery being closed by the usual screw-cap, these caps in the present case, however, being dispensed within and therefore not being shown in the accompanying drawings. The electrolyte or battery solution in Figs. 1 and 2 of the drawings is indicated by the reference-character 11.

Coming now to the filling-means, one construction of which is shown in the accompanying drawings, the same comprises a suitable container, as 12, which is made of hard rubber, or other suitable material which will have no effect upon the distilled water to be contained in said container, and will not deteriorate the battery plates. Suitably connected with the main body of the container or box 12 is a top or cover 13 which is provided with a filling-opening 14, closed by means of a removable cap 15, which is preferably provided with a vent in the form of a perforation 16, or the like. Suitably connected with and extending downwardly from the ends of said container or box 12 are supporting elements, as 17, each element being provided with suitably formed hanger-portions, as 18, for engagement with the handles 3, and for properly mounting the said container or box 12 above the storage-battery, substantially as illustrated in Figs. 1 and 2 of the drawings. If desired, the said container or box 12 may be provided in any one of its sides with a transparent window, as 19, or other suitable indicator for inspection of the level of the distilled water within said container or box. Furthermore, the bottom of the said container or box is provided with any desired outlet, as 20, corresponding to the number of cells of the storage-battery, and leading from each outlet is a tube 21, also of hard rubber or other suitable material. These tubes are usually provided with annular flanges, as 22, preferably provided with vent-holes or perforations 23, said flanges resting upon the annular portions 10 surrounding the filling-openings 9 of the battery-cells. As shown in said Figs. 1 and 2 of the drawings, the lower end-portions of the respective outlet tubes 21 extend into and through the respective filling-openings 9, and terminate in the electrolyte, at the proper distance above the plates in the respective cells.

As an extra precaution, each tube 21 may be provided with a suitably formed valve-seat, as 24, and a closing float 25, usually in the form of a ball, which when the solution in the cell is at the proper level, closes the opening in the valve-seat so as to shut off the main supply of water, and prevent the over-feeding of the battery-cell and spilling of the solution from the filling-opening as will be clearly evident. That the float may remain within the tube 21, the lower end-portion of each tube may have disposed therein a perforated disk or plate, as 26, which may be removed so as to replace the float, should the same for some unforeseen reason become stuck and hence inoperative. As shown a slight space is left between the outer cylindrical wall of each tube and the inner wall forming the filling-opening 9, to permit the escape of excessive heat and gas, from within the battery-cell through the vent-holes 23. The vent or perforation 16 in the cap 15 is for a similar purpose, but acts also to allow the outside air to exert a pressure upon the body of water within the container or box 12, so that the water will flow into the battery-cell as soon as the float 25 unseats itself from the valve-seat 24.

The operation of the device in connection with a storage-battery for maintaining the constant level of the battery-solution above the plates will be clearly understood from an inspection of said Figs. 1 and 2 of the drawings, and any further description of the same is, therefore, deemed unnecessary.

While in the accompanying drawings, I have shown the filling-device mounted directly upon the handles of the battery, it will be understood that the said filling-device may be placed in some other location at a distance from the battery, in which case the outlet tubes are made of sufficient length so as to be inserted in the filling-openings of the battery, as will be clearly understood.

The present illustration, shows but one embodiment of the principles of the present invention, and it will be understood, therefore, that the invention is capable of various changes and modifications without departing from the scope of the invention; and, I am aware that changes may be made in the general arrangements and combinations of the various devices and parts, without departing from the scope of the present invention as set forth in the foregoing specification, and as defined in the clauses of the claim which are appended to the said specification. Hence, I do not limit my present invention to the exact arrangements and combinations of the various devices and parts as described in the said specification, nor do I confine myself to the exact details of the construction of the said parts, as illustrated in the accompanying claims.

I claim:

1. In a means for automatically supplying a cell of a storage-battery with distilled water, in combination with the closed top of a cell having a filling opening, a container adapted to contain a quantity of the water, said container being independent of and being disposed above the cell, and a tubular element connected with said container, said tubular element having a portion extending into and through the usual filling-opening of said cell for conducting the water into said cell.

2. In a means for automatically supplying a cell of a storage-battery with distilled water, in combination with a closed top of a cell having a filling opening, a container adapted to contain a quantity of the water, said container being independent of and being disposed above the cell, and a tubular element connected with said container, said tubular element having a portion extending into and through the usual filling-opening of said cell for conducting the water into said cell, a valve-seat within said tubular element, and a float within said tubular element, adapted to automatically open and close said valve-seat.

3. In a means for automatically supplying a cell of a storage-battery with distilled water, in combination with a closed top of a cell having a filling opening, a container adapted to contain a quantity of the water, said container being independent of and being disposed above the cell, and a tubular element connected with said container, said tubular element having a portion extending into and through the usual filling-opening of said cell for conducting the water into said cell, a valve-seat within said tubular element, a float within said tubular element, adapted to automatically open and close said valve-seat, and a perforated disk within said tubular element at a point below said float.

4. In combination with a storage-battery comprising a plurality of cells, each cell having a closed top provided with a filling-opening, means connected with said battery in the form of a container adapted to contain a quantity of the water, said container being independent of and being disposed above said cells, and tubular elements connected with said container, each tubular element having a portion extending into and through a filling-opening for conducting water into said cells.

5. In combination with a storage-battery comprising a plurality of cells, each cell having a closed top provided with a filling-opening, means connected with said battery in the form of a container adapted to contain a quantity of the water, said container being independent of and being disposed above said cells, tubular elements connected with said container, each tubular element having a portion extending into and through a filling-opening for conducting water into said cells, a valve-seat within each tubular element, and a float within each tubular element, adapted to automatically open and close said valve-seats.

6. In combination with a storage-battery comprising a plurality of cells, each cell having a closed top provided with a filling-opening, means connected with said battery in the form of a container adapted to contain a quantity of the water, said container being independent of and being disposed above said cells, tubular elements connected with said container, each tubular element having a portion extending into and through a filling-opening for conducting water into said cells, a valve-seat within each tubular element, a float within each tubular element, adapted to automatically open and close said valve-seats, and a perforated disk within each tubular element at a point below each float.

7. In combination with a storage-battery comprising a plurality of cells, each cell having a filling-opening, a main battery-casing in which said cells are disposed, handles connected with and extending from said casing, a container adapted to contain distilled water, supporting means extending from said container adapted to be brought into supporting engagement with said handles, and means connected with said container for conducting water into said cells.

8. In combination with a storage-battery comprising a plurality of cells, each cell having a filling-opening, a main battery-casing in which said cells are disposed, handles connected with and extending from said casing, a container adapted to contain distilled water, supporting means extending from said container adapted to be brought into supporting engagement with said handles, and tubular elements connected with said container, each tubular element having a portion extending into and through a filling-opening for conducting water into said cells.

9. In combination with a storage-battery comprising a plurality of cells, each cell having a filling-opening, a main battery-casing in which said cells are disposed, handles connected with and extending from said casing, a container adapted to contain distilled water, supporting means extending from said container adapted to be brought into supporting engagement with said handles, and tubular elements connected with said container, each tubular element having a portion extending into and through a filling-opening for conducting water into said cells, a valve-seat within each tubular element, and a float within each tubular element, adapted to automatically open and close said valve-seats.

10. In combination with a storage-battery comprising a plurality of cells, each cell having a filling-opening, a main battery-casing in which said cells are disposed, handles connected with and extending from said casing, a container adapted to contain distilled water, supporting means extending from said container adapted to be brought into supporting engagement with said handles, and tubular elements connected with said container, each tubular element having a portion extending into and through a filling-opening for conducting water into said cells, a valve-seat within each tubular element, a float within each tubular element, adapted to automatically open and close said valve-seats, and a perforated disk within each tubular element at a point below each float.

In testimony that I claim the invention set forth above I have hereunto set my hand this 14th day of March, 1919.

EDWARD BLAU.

Witnesses:
    FRED'K C. FRAENTZEL,
    BARBARA SUTTERLIN.